United States Patent
Chae et al.

(10) Patent No.: US 8,613,087 B2
(45) Date of Patent: Dec. 17, 2013

(54) COMPUTING SYSTEM

(75) Inventors: JeongSeok Chae, Yongin-si (KR); Sunghyun Kim, Anyang-si (KR); Hyosun Hwang, Bucheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 48 days.

(21) Appl. No.: 13/312,350

(22) Filed: Dec. 6, 2011

(65) Prior Publication Data

US 2012/0151580 A1 Jun. 14, 2012

Related U.S. Application Data

(60) Provisional application No. 61/419,956, filed on Dec. 6, 2010.

(30) Foreign Application Priority Data

Feb. 9, 2011 (KR) .................. 10-2011-0011628

(51) Int. Cl.
*G06F 21/00* (2013.01)

(52) U.S. Cl.
USPC ........................................... 726/22

(58) Field of Classification Search
USPC ........................................... 726/22
See application file for complete search history.

(56) References Cited

U.S. PATENT DOCUMENTS

| | | | |
|---|---|---|---|
| 7,664,261 B2 | 2/2010 | Lee et al. | |
| 8,195,954 B2* | 6/2012 | Sohn | 713/189 |
| 2002/0166058 A1* | 11/2002 | Fueki | 713/194 |
| 2008/0256626 A1 | 10/2008 | Masui | |
| 2009/0126030 A1* | 5/2009 | Walmsley | 726/34 |
| 2010/0017621 A1* | 1/2010 | Crawford | 713/189 |
| 2010/0031064 A1* | 2/2010 | Walmsley | 713/194 |
| 2010/0039220 A1* | 2/2010 | Davis | 340/5.52 |
| 2010/0125904 A1 | 5/2010 | Nice et al. | |
| 2010/0235918 A1* | 9/2010 | Mizrahi et al. | 726/25 |
| 2011/0126065 A1* | 5/2011 | Bancel et al. | 714/732 |
| 2011/0265156 A1* | 10/2011 | Bombay | 726/5 |

FOREIGN PATENT DOCUMENTS

| | | |
|---|---|---|
| JP | 2008-262363 | 10/2008 |
| JP | 2009-529745 | 8/2009 |
| KR | 2006-0061219 | 6/2006 |
| KR | 2007-0094108 | 9/2007 |
| KR | 10-0865572 B1 | 10/2008 |
| KR | 2010-0112255 A | 10/2010 |

* cited by examiner

*Primary Examiner* — Matthew Smithers
(74) *Attorney, Agent, or Firm* — Harness, Dickey & Pierce, P.L.C.

(57) ABSTRACT

Disclosed is a computing system which comprises a data processing device exchanging communication data with the external and processing the communication data; and a security integrated circuit (IC) monitoring the communication data.

15 Claims, 13 Drawing Sheets

COMPUTING SYSTEM

CROSS-REFERENCE TO RELATED APPLICATIONS

This application claims the benefits, under 35 U.S.C §119, of U.S. Patent Provisional Application Ser. No. 61/419,956 filed on Dec. 6, 2010 in the U.S. Patent and Trademark Office (USPTO), and Korean Patent Application No. 10-2011-0011628 filed on Feb. 9, 2011 in the Korean Intellectual Property Office (KIPO), the entire contents of both of which are incorporated herein by reference.

BACKGROUND

1. Field

Exemplary embodiments relate to a computing system, and more particularly, relate to a security of a computing system.

2. Description of the Related Art

A terminal may provide a data communication function with the outside at the wire-wireless communication environment. Personal information (e.g., an e-mail, a telephone directory, etc.), cipher keys and critical information stored in the terminal can be leaked due to the data communication function. Further, information stored in the terminal can be damaged due to a virus flowing in the terminal.

If the terminal is lost or stolen, attacks for extracting information stored in the terminal may be made. For example, information stored in the terminal may be leaked due to a physical attack forced to the terminal. Data transferred within the terminal may be changed by forcing a laser, a high voltage, a high frequency, or light to a computing system within the terminal. Data leakage may be made by monitoring a data variation of the terminal. Data leakage can be made using an electrical signal generated whenever a computing system within the terminal operates, for example.

SUMMARY

According to at least one example embodiment a computing system comprises a data processing device exchanging communication data with the external and processing the communication data; and a security integrated circuit (IC) monitoring the communication data, wherein the security IC comprises a non-volatile memory storing a plurality of strings; and a comparing block judging whether the communication data coincides with at least one of the plurality of strings.

According to at least one example embodiment, the security IC further comprises a physical attack detector detecting a physical attack from the external to generate a reset signal according to the detection, wherein the plurality of strings stored in the non-volatile memory is deleted in response to the reset signal.

According to at least one example embodiment, the comparing block generates a disable signal according to whether the communication data is identical to at least one of the plurality of strings.

In this embodiment, the security IC controls a filtering of the communication data according to the disable signal.

According to at least one example embodiment, the security IC sends an interrupt signal to the data processing device according to the disable signal, and the data processing device responds to the interrupt signal to provide the security IC with a control signal for controlling a filtering of the communication data.

According to at least one example embodiment, the security IC filters the communication data according to the control signal.

According to at least one example embodiment, the data processing device makes inquires about an interruption of the communication data to a user in response to the interrupt signal and sends the control signal according to an input of the user.

According to at least one example embodiment, the plurality of strings is encoded, the encoded strings being stored in the non-volatile memory, and the security IC further includes a security intellectual property decoding the encoded strings.

According to at least one example embodiment, the communication data includes input data received from the external and output data generated by the data processing device, and the security IC further comprises a crypto intellectual property decoding data received from the external to provide the decoded data as the input data and encoding the output data.

According to at least one example embodiment, the computing system further comprises a universal integrated circuit card exchanging the communication data with the data processing device.

According to at least one example embodiment, the security IC further comprises an active shield layer formed of a plurality of conductive lines; and a detector generating a reset signal when at least one of the plurality of conductive lines is cut, a plurality of strings stored in the non-volatile memory being erased in response to the reset signal.

According to at least one example embodiment a computing system comprises a data processing device including a main processor and generating output data according to a control of the main processor; a security IC including a non-volatile memory storing output prohibition strings and filtering the output data by judging whether the output data coincides with at least one of the output prohibition strings; and a transceiver outputting the filtered output data to the external.

According to at least one example embodiment, the security IC further comprises an internal buffer temporarily storing the output data; and a comparing block generating a disable signal by judging whether the output data store din the internal buffer coincides with at least one of the output prohibition strings.

In this embodiment, the security IC further comprises a security processor controlling the internal buffer and the comparing block, and the security processor controls the internal buffer so as to erase the output data or send the output data to the transceiver according to the disable signal.

According to at least one example embodiment, the security IC further comprises a security processor controlling the internal buffer and the comparing block and generating an interrupt signal according to the disable signal, the data processing device transfers a control signal to the security IC in response to the interrupt signal, and the security processor controls the internal buffer so as to erase the output data or send the output data to the transceiver according to the control signal.

According to at least one example embodiment, the non-volatile memory stores input prohibition strings.

According to at least one example embodiment, the computing system further comprises a receiving device receiving input data from the external, wherein the security IC further comprises an internal buffer temporarily storing the input data transferred from the receiving device; and a comparing block generating a disable signal by judging whether the input data stored in the internal buffer is identical to at least one of the input prohibition strings.

According to at least one example embodiment, the security IC filters the input data according to the disable signal and sends the filtered input data to the data processing device.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
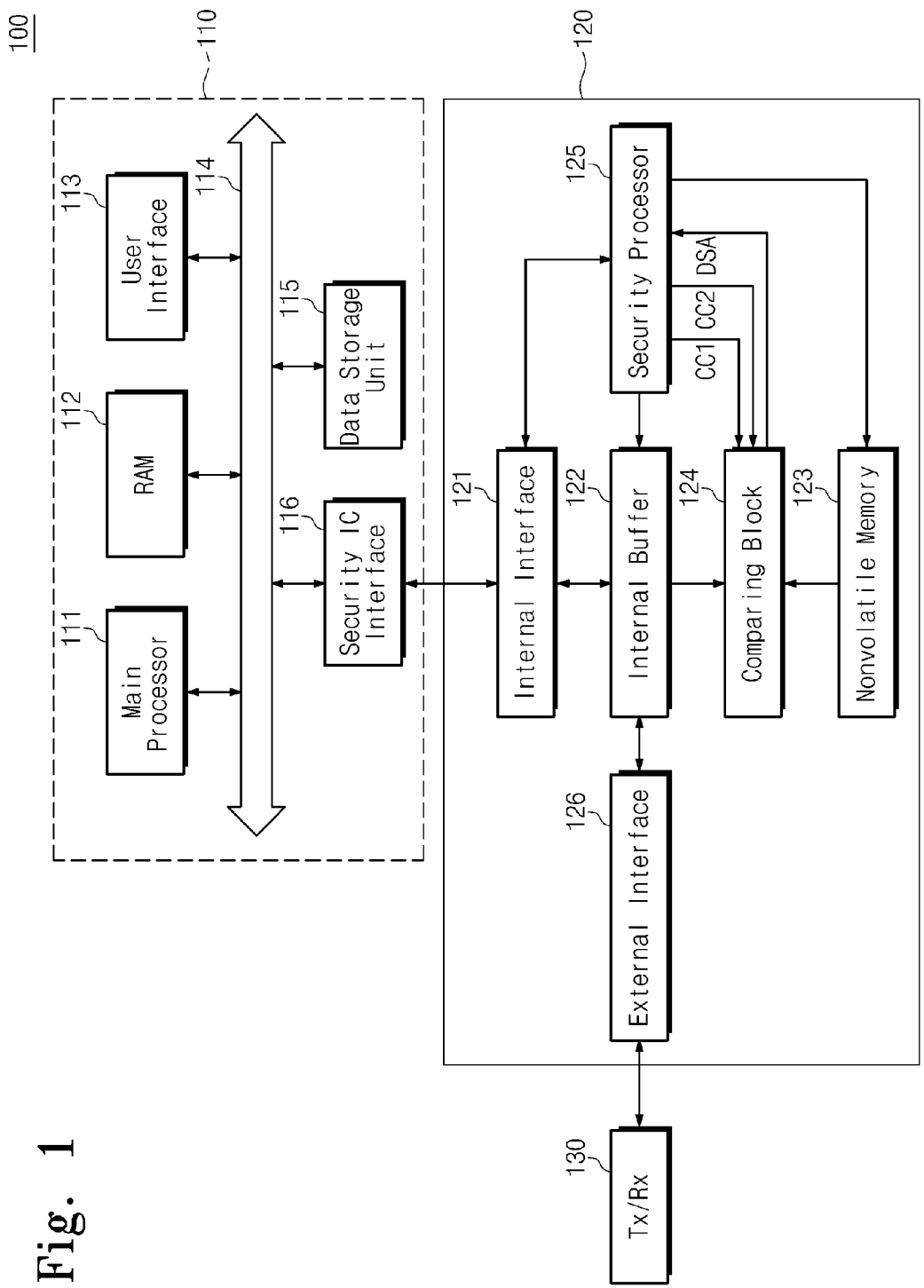
FIG. 1 is a block diagram of a computing system according to at least one example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram of a computing system according to at least one example embodiment. A computing system 100 may include a data processing device 110, a security integrated circuit 120 and a transceiver device 130. The computing system 100 may transmit and receive data via the transceiver device 130 at a wireless, wired, or wire-wireless environment.

The data processing device 110 may be configured to communicate with the outside, e.g. entities outside the computing system 100, via the security integrated circuit 120 and the transceiver 130 and to process communicated data. The data processing device 110 may include a main processor 111, a RAM 112, a user interface 113, a bus 114, a data storage unit 115, and a security IC interface 116.

The main processor 111 may be connected to the RAM 112, the user interface 113, the data storage unit 115, and the security IC interface 116 via a bus 114. The main processor 111 may control an overall operation of the computing system 100. The main processor 111 may be configured to load data stored in the data storage unit 115 onto the RAM 112 and to process the loaded data of the RAM 112. For example, in the event that an application program is being executed, the application program stored in the data storage unit 115 may be loaded onto the RAM 112 under the control of the main processor 111. The main processor 111 may execute the application program by processing commands included in the application program stored in the RAM 112.

Data input by a user may be received through the user interface 113. According to at least one example embodiment, data received via the user interface 113 can be used for execution of the application program. Data provided through the user interface 113 or generated according to execution of the application program may be transferred to the security IC interface 116. Private information or critical information provided through the user interface 113 or loaded onto the RAM 112 through execution of the application program may be sent to the security IC circuit 120.

The bus 114 may electrically connect the main processor 111, the RAM 112, the user interface 113, the data storage unit 115 and the security IC interface 116. For example, the bus 114 may electrically connect the RAM 112 and the security IC interface 116.

The data storage unit 115 may be connected to the bus 114. The data storage unit 115 may store application programs, data for executing an operating system (OS), data for executing middleware, private information (e.g., an e-mail, a telephone directory, etc.), critical information, and so on.

Data stored in the data storage unit 115 may be retained even at power-off. According to at least one example embodiment, the data storage unit 115 may be formed of at least one of a semiconductor memory device and a hard disk drive (HDD).

When receiving a write command, an address and data from the bus 114, the data storage unit 115 may write received data in memory cells corresponding to the received address. When a read command and an address are received from the bus 114, data of memory cells corresponding to the received address may be read out from the data storage unit 115.

According to at least one example embodiment, if the data storage unit 115 is formed of a semiconductor memory, the data storage unit 115 may be a solid state drive (SSD). The SSD may include a storage device which is configured to store data in a semiconductor memory.

According to at least one example embodiment, the data storage unit 115 may be a memory card. For example, the data storage unit 115 may be formed of a memory card such as a PC (PCMCIA, personal computer memory card international association) card, a compact flash (CF) card, a smart media card (SMC), a memory stick, a multimedia card (MMC, RS-MMC, MMCmicro), an SD card (SD, miniSD, microSD, SDHC), a universal flash storage (UFS) device, or the like.

The security IC interface 116 may be connected to the bus 114 and the security IC 120. Output data provided from the bus 114 may be transferred to the security IC 120 via the security IC interface 116. The output data may mean, for example, data transferred from the computing system to the outside. For example, the output data may be generated according to execution of an application program, received from the user interface 113, or read out from the data storage unit 115.

Input data transferred from the security IC 120 may be sent to the security IC interface 116. The input data may represent data which is transferred from the outside to the computing system 100. For example, the input data may be an application program received from the outside. For example, the input data may include commands and codes constituting an application program.

The security IC 120 may provide a high security level such as an integrated circuit card. For example, the security IC 120 may be configured to include an active shield layer, a detector, and so on which are not illustrated in FIG. 1. The active shield layer may be formed of a plurality of conductive lines covering a top of the security IC 120. The plurality of conductive lines may prevent an inner configuration of the security IC 120 from being exposed. A shield unit including, for example, an insulation material may cover the active shield layer. In the event that the shield unit is removed, at least one of conductive lines of the active shield layer may be cut. The detector may generate a reset signal when at least one of the conductive lines is cut. The security IC 120 may erase data stored in a non-volatile memory according to the reset signal.

The transceiver 130 may be connected with the security IC 120. The transceiver 130 may provide the security IC 120 with data received from the outside. The transceiver 130 may output data received from the security IC 120 to the outside. The transceiver 130 may conduct data communications with the outside at a wire, wireless or wire-wireless environment.

According to at least one example embodiment, the transceiver 130 may be formed of at least one of a modem, a Near Field Communication (NFC) device, a cable modem, or a radio frequency identification device (RFID), or a combination thereof.

The security IC 120 may monitor communication data. The security IC 120 may block off the communication data when the communication data matches with at least one of a plurality of strings stored in the non-volatile memory 123. That is, the security IC 120 may filter the communication data. At this time, the communication data may include output data transferred to the outside via the security IC 120 and the transceiver 130 and input data received to the data processing device 110 via the security IC 120 and the transceiver device 130.

The security IC 120 may include an internal interface 121, an internal buffer 122, a non-volatile memory 123, a comparing block 124, a security processor 125, and an external interface 126.

The internal interface 121 may be connected with the security IC interface 116. The internal interface 121 may send output data received from the security IC interface 116 to the internal buffer 122. Input data received via the external interface 126 may be temporarily stored in the internal buffer 122, and the input data in the internal buffer 122 may be transferred to the security IC interface 116 via the internal interface 121.

The internal buffer 122 may temporarily store communication data. The internal buffer 122 may respond the control of the security processor 125 to send stored communication data to the internal interface 121 or the external interface 126. For example, the internal buffer 122 may be at least one of an SRAM, a DRAM, or an SDRAM.

The non-volatile memory 123 may store a plurality of strings. That is, the non-volatile memory 123 may store output-prohibition strings and input-prohibition strings. The non-volatile memory 123 may provide the output-prohibition strings and input-prohibition strings to the comparing block 124.

The output-prohibition strings may correspond to private information and critical information of a user. For example, the input-prohibition strings may correspond to commands and codes included in a virus.

The virus may represent software which is made to damage the computing system 100, to modify data stored therein, and to leak data thereof. For example, the virus may mean a combination of commands which damage the computing system 100 by making data executed at the computing system 100 be modified and copying its own self and own modification to the computing system 100. For example, the virus may include Trojan horse, Spyware, key logger, remote administrator, and so on.

According to at least one example embodiment, the non-volatile memory 123 may be an electrically erasable and programmable ROM (EEPROM), a flash memory, a phase-change RAM (PRAM), a magnetic RAM (MRAM), a resistive RAM (RRAM), a ferroelectric RAM (FRAM), or the like.

The comparing block 124 may be connected with the internal buffer 122 and the non-volatile memory 123. The comparing block 124 may respond to the control the security processor 125 to compare communication data stored in the internal buffer 122 with strings stored in the non-volatile memory 123. The comparing block 124 may generate a disable signal DSA according to whether the communication data coincides with at least one of the strings stored in the non-volatile memory 123.

In response to the first comparison command CC1, the comparing block 124 may judge whether output data temporarily stored in the internal buffer 122 coincides with at least one of output-prohibition strings stored in the non-volatile memory 123. For example, the security processor 125 may generate the first comparison command CC1 and simultaneously control the non-volatile memory 123 such that the output-prohibition strings are sent to the comparing block 124. If the output data coincides with at least one of the output-prohibition strings, the comparing block 124 may activate the disable signal DSA. For example, the comparing block 124 may activate the disable signal DSA when the output data coincides with at least one of the output-prohibition strings.

In response to the second comparison command CC2, the comparing block 124 may judge whether input data temporarily stored in the internal buffer 122 is identical to at least one of input-prohibition strings stored in the non-volatile memory 123. For example, the security processor 125 may generate the second comparison command CC2 and simultaneously control the non-volatile memory 123 such that the input-prohibition strings are sent to the comparing block 124. If the input data is identical to at least one of the input-prohibition strings, the comparing block 124 may activate the disable signal DSA. For example, the comparing block 124 may activate the disable signal DSA when communication data is identical to at least one of the input-prohibition strings.

The security processor 125 may control an overall operation of the security IC 120. The security processor 125 may generate the first and second comparison signals CC1 and CC2 to control the comparing block 124. The security processor 125 may delete communication data stored in the internal buffer 122 when the disable signal DSA is activated. When the disable signal DSA is at an inactive state, the security processor 125 may control the internal buffer 122 such that communication data stored in the internal buffer 122 is transferred to the internal interface 121 or the external interface 126.

The external interface 126 may communicate with the transceiver 130. The external interface 126 may transfer input data received via the transceiver 130 to the internal buffer 122. Output data received via the internal interface 121 may be temporarily stored in the internal buffer 122 so as to be sent to the transceiver device 130 via the external interface 126.

According to at least one example embodiment, the internal interface 121 and external interface 126 can be interconnected via an internal bus. For example, the internal bus may connect at least two ones of constituent elements included in the security IC 120 according to the control of the security processor 125.

According to at least one example embodiment, the computing system 110 may be formed of computer, portable computer, Ultra Mobile PC (UMPC), workstation, net-book, PDA, web tablet, wireless phone, mobile phone, smart phone, e-book, PMP (portable multimedia player), digital camera, digital audio recorder/player, digital picture/video recorder/player, portable game machine, navigation system, black box, 3-dimensional television, a device capable of transmitting and receiving information at a wireless circumstance, one of various electronic devices constituting home network, one of various electronic devices constituting computer network, one of various electronic devices constituting telematics network, RFID, or one of various electronic devices constituting a computing system.

According to at least one example embodiment, the computing system 100 may filter communication data. The computing system 100 may include a security IC 120 which is configured to block off communication data when the communication data coincides with at least one of a plurality of strings. Accordingly, the computing system 100 may be provided to prevent private and critical information from being leaked. Further, the computing system 100 may be provided to prevent virus attacks.

Figure 2:
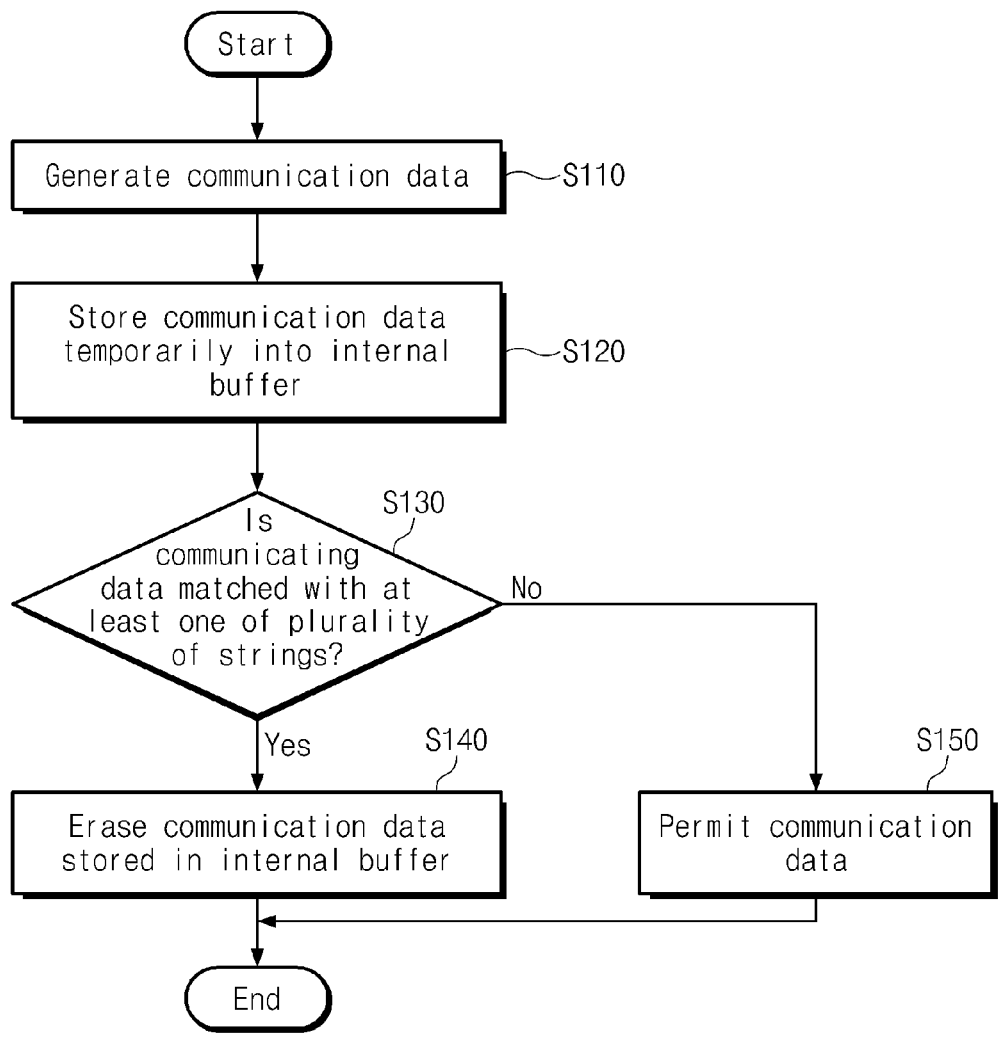
FIG. 2 is a flowchart for describing an operating method of a computing system 100 illustrated in FIG. 1.

FIG. 2 is a flowchart for describing an operating method of a computing system 100 illustrated in FIG. 1.

Referring to FIGS. 1 and 2, in operation S110, communication may be generated within a computing system 100.

In operation S120, the computing system 100 may temporarily store the communication data in an internal buffer 122.

In operation S130, the computing system 100 may judge whether the communication data stored in the internal buffer 122 coincides with strings stored in a non-volatile memory 123. A comparing block 124 within a security IC 120 may compare the communication data with the strings stored in the non-volatile memory device 123. The security IC 120 may filter the communication data according to whether the communication data is identical to at least one of the strings in the non-volatile memory 123. If the communication data is identical to at least one of the strings in the non-volatile memory 123, the method proceeds to operation S140. If the communication data is not identical to at least one of the strings in the non-volatile memory 123, the method proceeds to operation S150.

In operation S140, the computing system 100 may delete the communication data stored in the internal buffer 122. For example, data stored in the internal buffer 122 may be deleted according to the control of a security processor 124 within the security IC 120.

In operation S150, the computing system 100 may permit inflow or outflow of the communication data. That is, the computing system 100 may send output data to the outside or input data to a data processing device 110.

Figure 3:
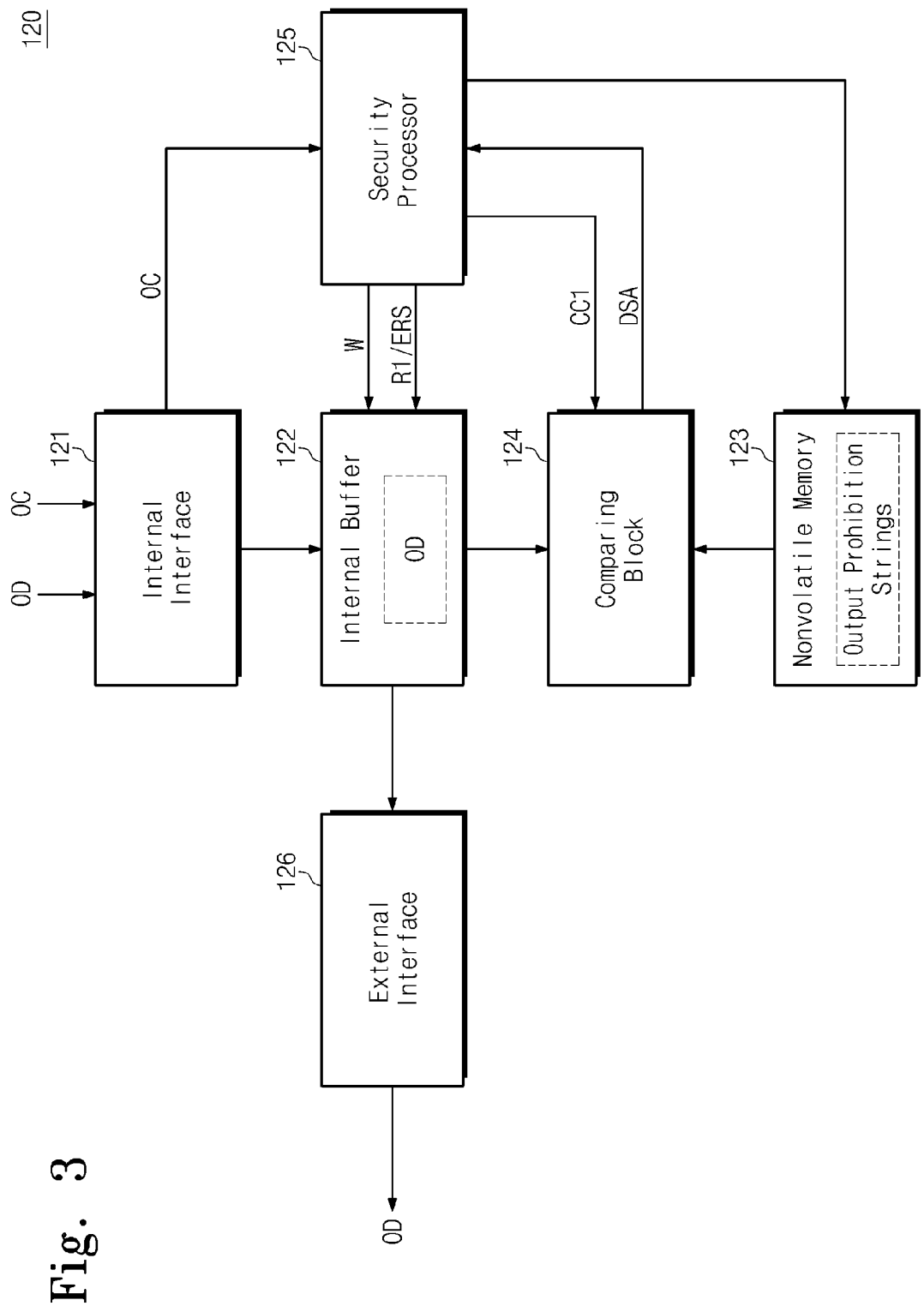
FIG. 3 is a diagram for describing an operation of a security IC 120 when output data is generated.

FIG. 3 is a diagram for describing an operation of the security IC 120 when output data is generated.

Referring to FIG. 3, an internal interface 121 may receive output data OD and an output command OC from a data processing device 110 (refer to FIG. 1). For example, the output data OD may be received following the output command OC. The internal interface 121 may send the output command OC to a security processor 125 and the output data OD to an internal buffer 122.

The internal buffer 122 may store the output data OD provided from the internal interface 121. The internal buffer 122 may store the output data OD in response to a write command W from the security processor 125.

A comparing block 124 may compare the output data OD in the internal buffer 122 with output-prohibition strings stored in a non-volatile memory 123 in response to the first comparison command CC1. The comparing block 124 may generate a disable signal DSA according to the comparison. For example, the comparing block 124 may activate or inactivate the disable signal DSA according to whether the output data OD is identical to at least one of the output-prohibition strings. For example, the comparing block 124 may send a pulse signal to the security processor 125 as an activation of the disable signal DSA.

The security processor 125 may control an overall operation of the security IC 120. The security processor 125 may send the write command W to the internal buffer 122 in response to the output command OC received from the internal interface 121. The security processor 125 may transfer the first comparison signal CC1 to the comparing block 124 in response to the output command OC. The first comparing command CC1 may be provided after the write command W is sent.

In response to the disable signal DSA, the security processor 125 may selectively generate the first read command R1 and an erase command ERS. When the disable signal DSA is activated, the security processor 125 may transfer the erase command ERS to the internal buffer 122. In response to the erase command ERS, the internal buffer 122 may erase stored output data OD. For example, the internal buffer 122 may erase the output data OD by writing '0' in an area where the output data is OD stored.

When the disable signal DSA is inactivated, the security processor 125 may send the first read command R1 to the intern buffer 122. In response to the first read command R1, the internal buffer 122 may transfer the output data OD to the external interface 126.

For example, the security processor 125 may include a register (not shown). The security processor 125 may temporarily store the output command OC received from the internal interface 121 in the register. That the output command OC is stored in the security processor 125 may mean that data stored in the internal buffer 122 is the output data OD. When the disable signal DSA is at an inactive state, the security processor 125 may transfer the first read command R1 to the internal buffer 122 such that the output data OD is sent to the external interface 126.

Unlike an example in FIG. 3, according to at east one example embodiment, both output data OD and an output command OC received through the internal interface 121 can be stored in the internal buffer OD. When the disable signal DSA is at an inactive state, the security processor 125 may read the output command OC stored in the internal buffer 122. The output command OC being stored in the internal buffer 122 may represent that data stored in the internal buffer 122 is output data OD. The security processor 125 may generate the first read command R1 such that the output data OD is sent to the external interface 126 according to the output command OC read from the internal buffer 122.

Figure 4:
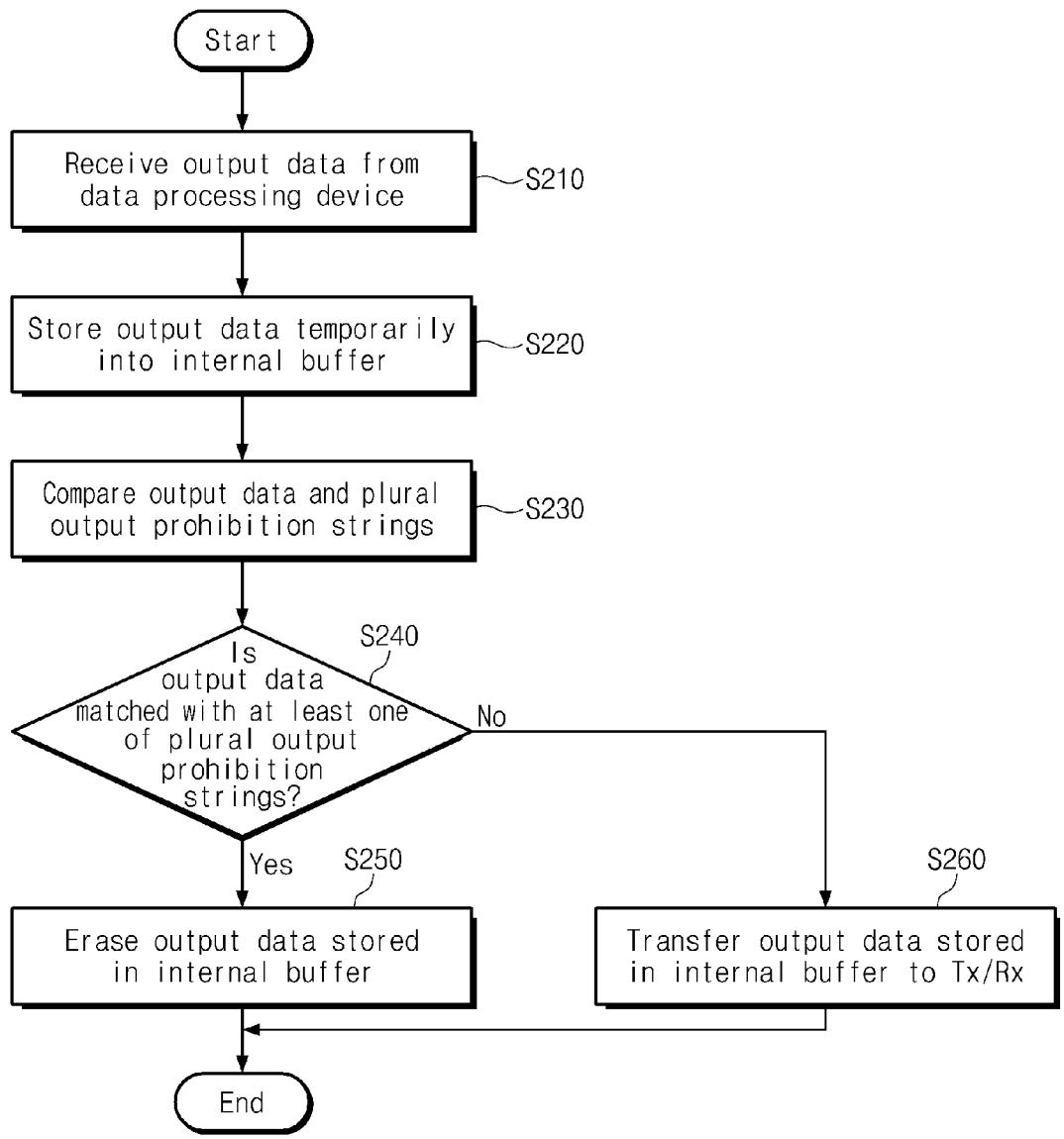
FIG. 4 is a flowchart for describing an operating method of a security IC illustrated in FIG. 3.

FIG. 4 is a flowchart for describing an operating method of the security IC 120 illustrated in FIG. 3.

Referring to FIGS. 3 and 4, in operation S210, the security IC 120 may receive output data OD from a data processing device 210.

In operation S220, the security IC 120 may temporarily store the output data OD in an internal buffer 122. The output data OD received via the internal interface 121 may be stored in the internal buffer 122 under the control of the security processor 125.

In operation S230, the security IC 120 may compare the output data OD stored in the internal buffer 122 with a plurality of output-prohibition strings stored in the non-volatile memory 123. In operation S240, the security IC 120 may judge whether the output data OD is identical to at least one of the output-prohibition strings. The security IC 120 may filter the output data OD stored in the internal buffer 122 according to the comparison. If the output data OD is identical to at least one of the output-prohibition strings, the method proceeds to operation S250. If the output data OD is not identical to at least one of the output-prohibition strings, the method proceeds to operation S260.

In operation S250, the security IC 120 may erase the output data OD stored in the internal buffer 122. The internal buffer 122 may erase the output data OD under the control of the security processor 125.

In operation S260, the security IC 120 may send data stored in the internal buffer 122 to a transceiver 130 (refer to FIG. 1). The internal buffer 122 may send the output data OD to an external interface 126 in response to the first read command R1 received from the security processor 125. The external interface 126 may transfer the output data OD to the transceiver 130.

Figure 5:
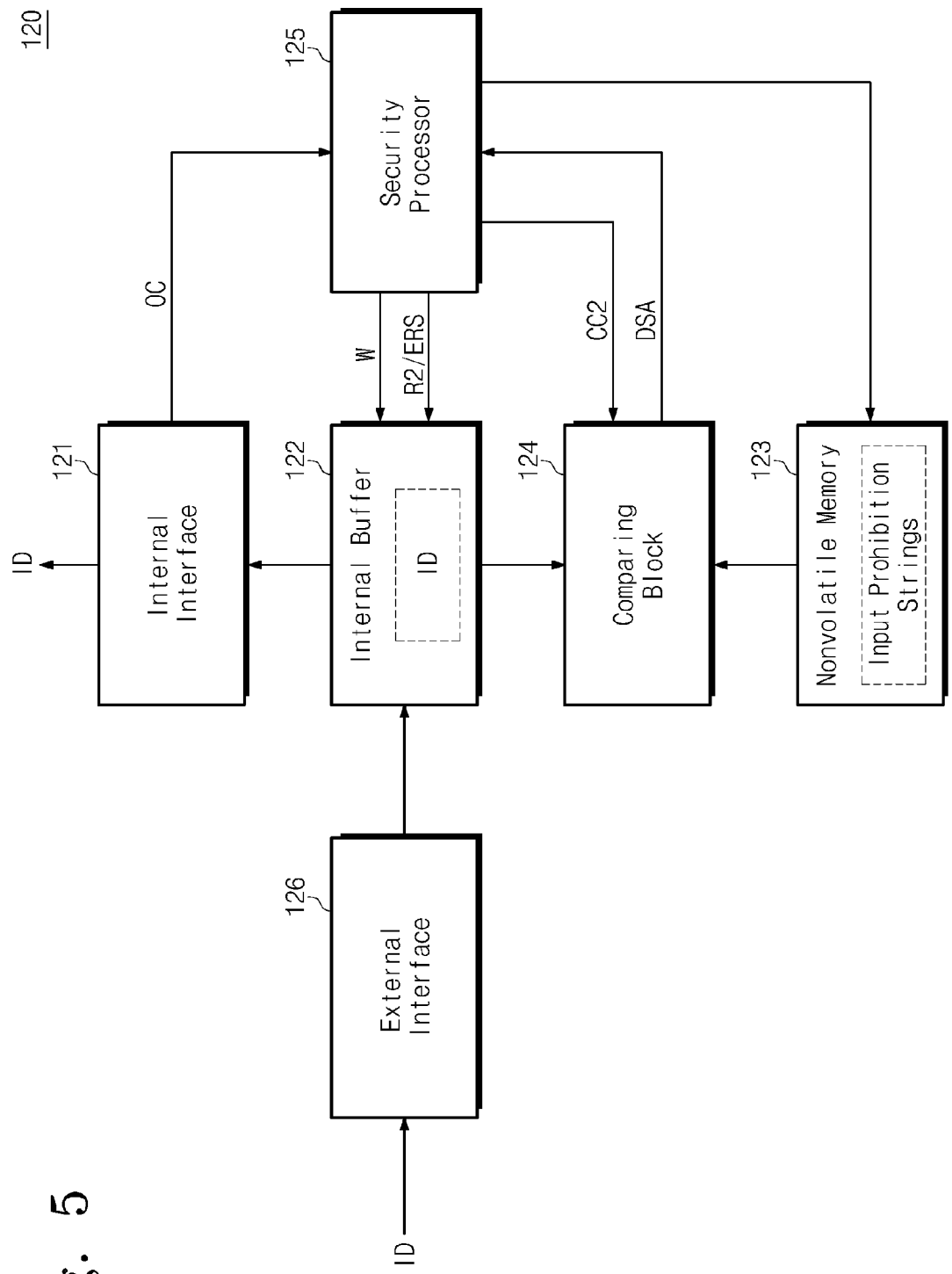
FIG. 5 is a diagram for describing an operation of a security IC when input data ID is generated.

FIG. 5 is a diagram for describing an operation of a security IC when input data ID is generated. Referring to FIG. 5, an external interface 126 may send input data ID received from the outside to an internal buffer 122. The internal buffer 122 may store the input data from the external interface 126 in response to a write command W.

A security processor 125 may detect whether input data ID is received via the external interface 126. If the input data ID is received, the security processor 125 may provide the internal buffer 122 with the write command W. Upon receiving of the input data ID, the security processor 125 may generate the second comparison command CC2 to provide it to a comparing block 124.

In response to the second comparison command CC2, the comparing block 124 may judge whether the input data ID in the internal buffer 122 is identical to at least one of input-prohibition strings stored in a non-volatile memory 123. The comparing block 124 may activate or inactivate a disable signal DSA according to the comparison.

The security processor 125 may selectively generate the second read command R2 and an erase command ERS in response to the disable signal DSA. When the disable signal DSA is activated, the security processor 125 may send the erase command ERS to the internal buffer 122. When the disable signal DSA is inactivated, the security processor 125 may send the second read command R2 to the internal buffer 122. In response to the second read command R2, the internal buffer 122 may send the input data ID to an internal interface 121.

According to at least one example embodiment, the security processor 125 may include a register (not shown). The security processor 125 may temporarily store the second comparison command CC2, generated according to an input of the input data ID, in the register. In the event that the second comparison command CC2 is stored, the security processor 125 may generate the second read command R2, not the first read command R1 (refer to FIG. 3).

Figure 6:
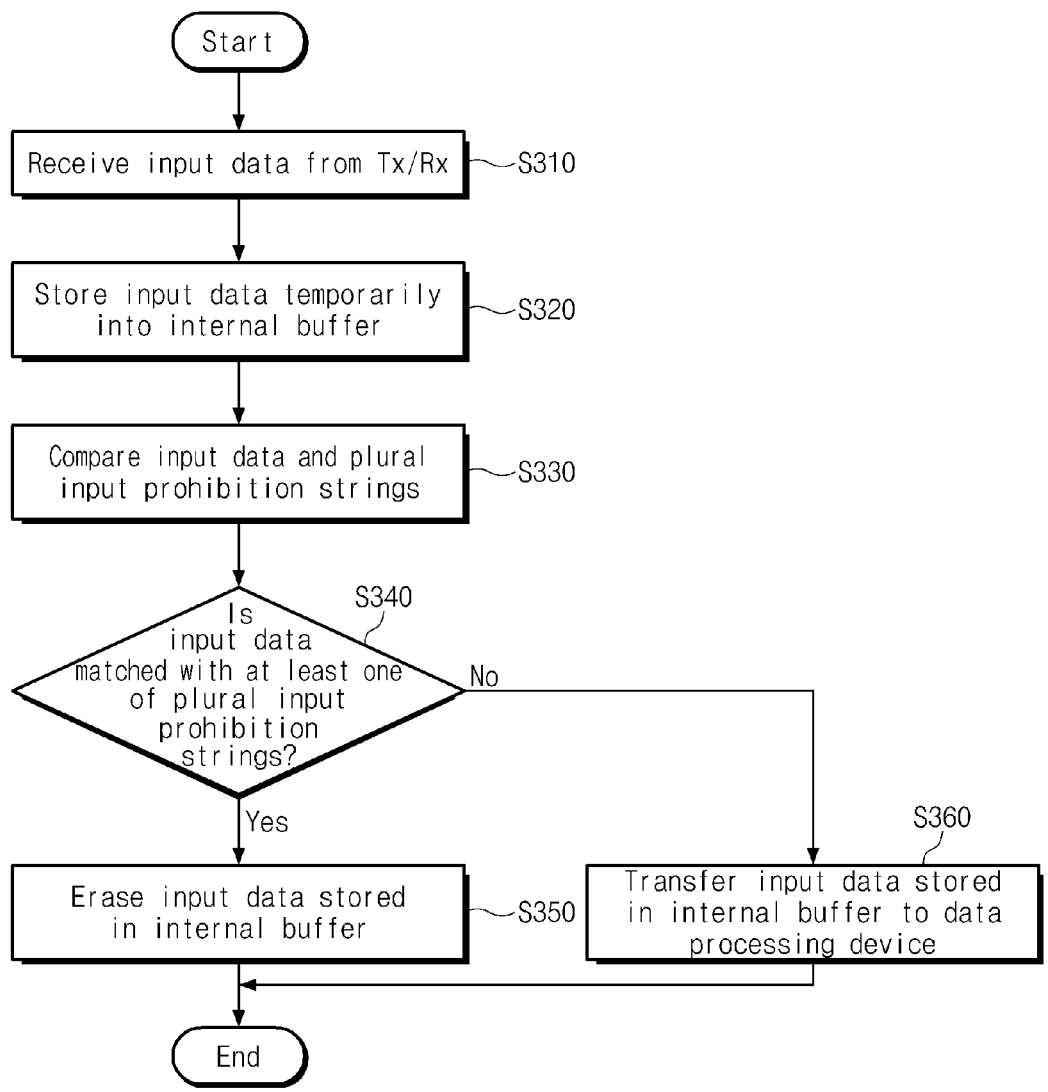
FIG. 6 is a flowchart showing an operating method of a security IC illustrated in FIG. 5.

FIG. 6 is a flowchart showing an operating method of a security IC illustrated in FIG. 5.

Referring to FIGS. 5 and 6, in operation S310, a security IC 120 may receive input data from a transceiver 130 (refer to FIG. 1). The input data ID may be received via an external interface 126.

In operation S320, the security IC 120 may temporarily store the input data ID in an internal buffer 122. The internal buffer 122 may store the input data ID in response to a write command W from the security processor 125.

In operation S330, the security IC 120 may compare the input data ID with input-prohibition strings stored in a non-volatile memory 123. In operation S340, the security IC 120 may judge whether the input data ID is identical to at least one of input-prohibition strings. The security processor 120 may filter the input data ID in the internal buffer 122 according to the comparison. If the input data ID is identical to at least one of input-prohibition strings, the method proceeds to operation S350. If the input data ID is not identical to at least one of input-prohibition strings, the method proceeds to operation S360.

In operation S350, the security IC 120 may erase the input data ID stored in the internal buffer 122. The security processor 125 may generate an erase command ERS in response to an activation of a disable signal DSA. The internal buffer 122 may delete the stored input data ID in response to the erase command ERS.

In operation S360, the security IC 120 may send the input data ID in the internal buffer 122 to a data processing device 110 (refer to FIG. 1). When the disable signal DSA is at an inactive state, the security processor 125 may generate the second read command R2. The internal buffer 122 may transfer the input data ID to an internal interface 121 in response to the second read command R2. The input data ID may be sent to the data processing device 110 via the internal interface 121.

Figure 7:
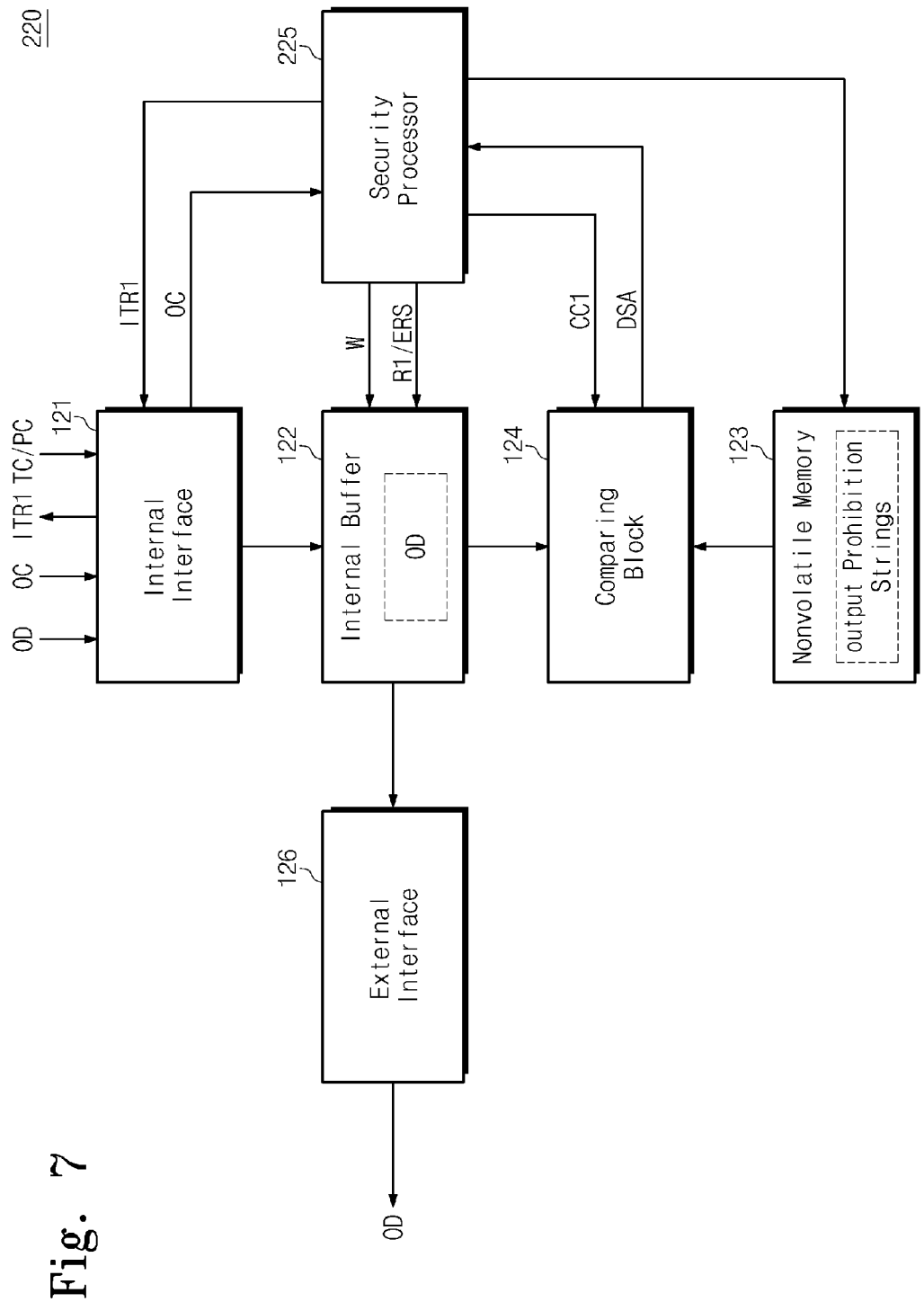
FIG. 7 is a block diagram of a security IC according to at least one example embodiment.

FIG. 7 is a block diagram of a security IC 220 according to at least one example embodiment.

Referring to FIGS. 1 and 7, an internal interface 121 may receive output data OD and an output command OC. A disable signal DSA may be generated in the same manner as described in FIG. 3, and description thereof is thus omitted. According to example embodiments, the computing system 100 illustrated in FIG. 1 may include the security IC 220 in place of the security IC 120.

A security processor 225 may generate the first interrupt signal ITR1 in response to the disable signal DSA. The security processor 225 may receive a transfer command TC and a prohibition command PC via an internal interface 121. The security processor 225 may generate the first read command R1 in response to the transfer command TC. The security processor 225 may generate an erase command ERS in response to the prohibition command PC.

In particular, when the disable signal DSA is at an inactive state, the security processor 225 may send the first read command R1 to an internal buffer 122. Output data OD stored in the internal buffer 122 may be transferred to a transceiver 130 through an external interface 126 according to the first read command R1.

When the disable signal DSA is activated, the security processor 225 may generate the first interrupt signal ITR1. The security processor 225 may operate at a standby mode until the transfer command TC or the prohibition command PC is received. The first interrupt signal ITR1 may be provided to the data processing device 110 via the internal interface 121.

In response to the first interrupt signal ITR1, the data processing device 110 may provide the transfer command TC or the prohibition command PC to the security IC 220. The security processor 220 may receive the commands TC and PC via the internal interface 121. In response to the transfer command TC, the security processor 225 may generate the first read command R1. In response to the prohibition command PC, the security processor 225 may generate an erase command ERS.

For example, in response to the first interrupt signal ITR1 received from the security IC 220, the data processing device 110 may inquire whether providing of output data OD to a user via the user interface 113 is allowable. If a signal for prohibiting outflow of the output data OD via the user interface 113 is received, the data processing device 110 may generate the prohibition command PC. If a signal for allowing outflow of the output data OD via the user interface 113 is received, the data processing device 110 may generate the transfer command TC. The commands TC and PC may be sent to the security IC 220 via a security IC interface 116.

For example, the first interrupt signal ITR1 may be sent to a main processor 111 via the security IC interface 116. It is assumed that a display panel (not shown) is connected with the user interface 113. The main processor 111 may control the display panel such that an image of making inquires about outflow of output data is displayed. A signal of prohibiting or allowing outflow of the output data OD may be provided to the data processing device 110 via the user interface 113.

Figure 8:
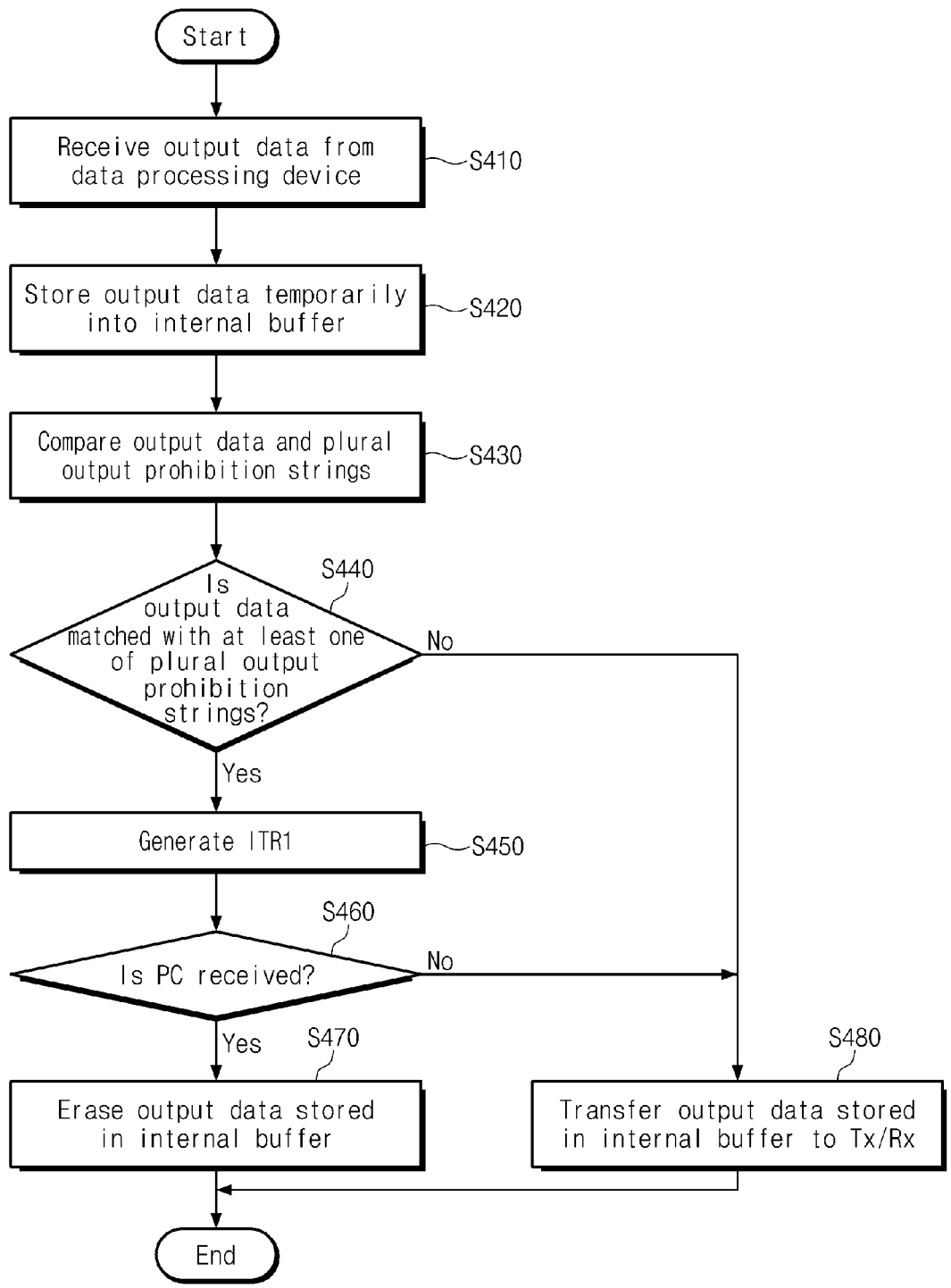
FIG. 8 is a flowchart showing an operating method of a security IC illustrated in FIG. 7.

FIG. 8 is a flowchart showing an operating method of a security IC illustrated in FIG. 7.

Referring to FIG. 8, operations S410 to S430 may be performed the same as operations S210 to S230, and description thereof is thus omitted.

In operation S440, a security IC 220 may judge whether output data OD coincides with at least one of output-prohibition strings.

In operation S450, the security IC 220 may generate the first interrupt signal ITR1. The first interrupt signal ITR1 may be sent to a data processing device 110. In operation S460, the security IC 220 may judge whether a prohibition command PC is received from the data processing device 110. If the prohibition command PC is received, the method proceeds to operation S470. If no prohibition command PC is received, the method proceeds to operation S480.

In operation S470, the security IC 220 may erase output data stored in an internal buffer 122. The security processor 225 may transfer an erase command ERS to the internal buffer 122 in response to the prohibition command PC received through the internal interface 121. The internal buffer 122 may erase stored output data OD in response to the erase command ERS.

In operation S480, the security IC 220 may send output data OD stored in the internal buffer 122 to a transceiver 130. The output data OD transferred to the transceiver 130 may be output to the outside. In particular, the security processor 225 may send the first read command R1 to the internal buffer 122 in response to the transfer command TC provided via the internal interface 122. The internal buffer 122 may send the output data OD to the transceiver 126 in response to the first read command R1.

Figure 9:
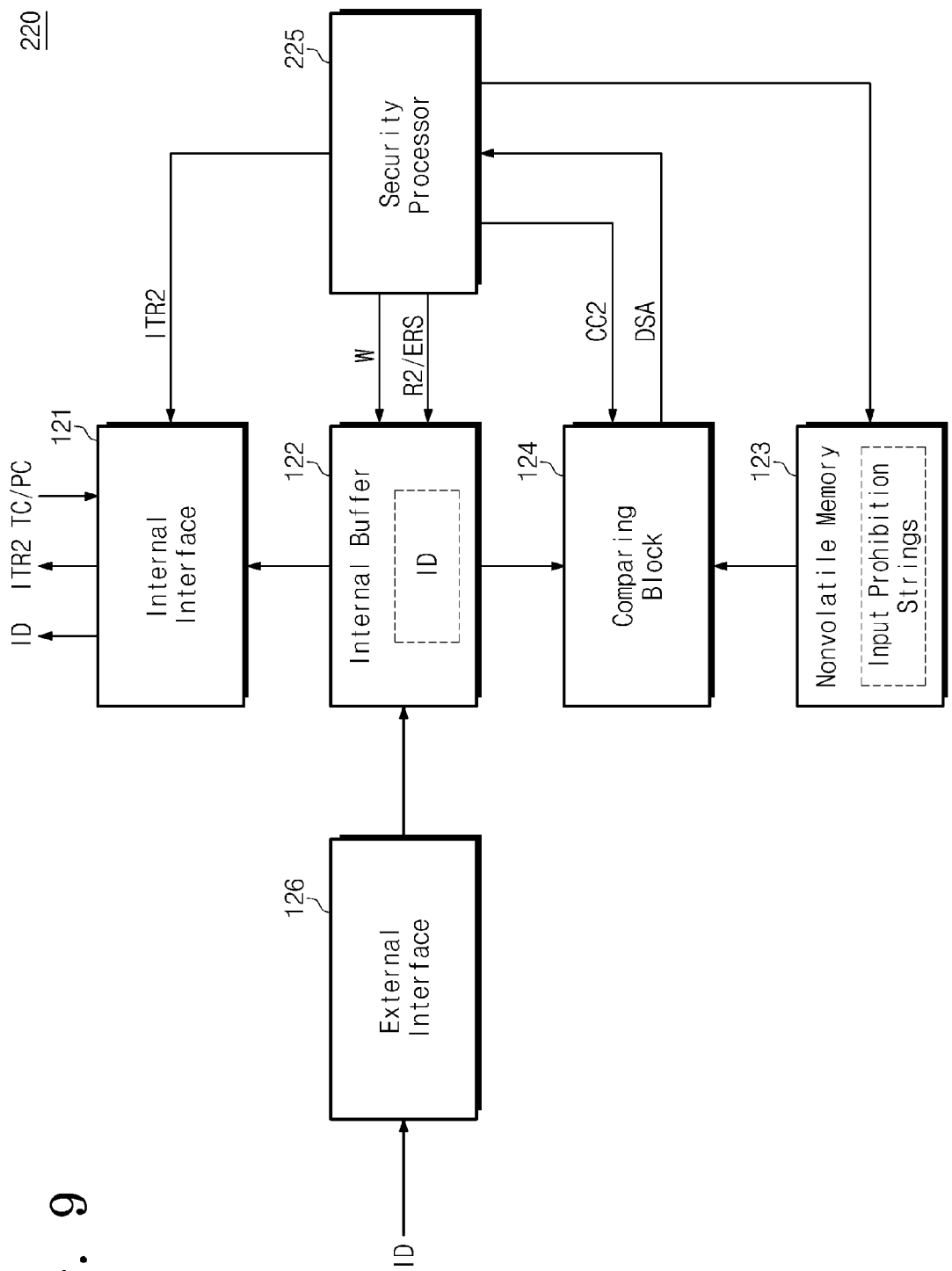
FIG. 9 is a block diagram for describing an operation of a security IC when input data ID is generated.

FIG. 9 is a block diagram for describing an operation of a security IC 220 when input data ID is generated.

Constituent elements 122, 123, 124 and 126 in FIG. 9 may be identical to those in FIG. 5, and description thereof is thus omitted. A disable signal DSA may be generated in the same manner described above with reference to FIG. 5, and description thereof is thus omitted.

When the disable signal DSA is at an inactive state, a security processor 225 may transfer the second read command R2 to an internal buffer 122. The internal buffer 122 may send stored input data ID to an internal interface 121 in response to the second read command R2.

When the disable signal DSA is at an active state, the security processor 225 may generate the second interrupt signal ITR2. The security processor 225 may operate at a standby state until a transfer command TC or a prohibition command PC is received. For example, the security processor 225 may include a register (not shown). The security processor 225 may store the second comparison command CC2, which is generated when input data ID is provided to an external interface 126, in the register. In the event that the second comparison command CC2 is stored, the security processor 225 may respond to the disable signal DSA to generate the second interrupt signal ITR2, not the first interrupt signal ITR1 (refer to FIG. 7).

A data processing device 110 may selectively provide the transfer command TC and the prohibition command PC to the security IC 220 in response to the second interrupt signal ITR2. For example, in response to the second interrupt signal ITR2, the data processing device 110 may make inquires about inflow of input data to a user via a user interface 113.

The data processing device 110 may provide the transfer command TC or the prohibition command PC to the security IC 220 according to an input of the user.

In response to the prohibition command PC, the security processor 225 may send an erase command ERS to the internal buffer 122. The internal buffer 122 may erase the input data ID in response to the erase command ERS.

The security processor 225 may send the second read command R2 to the internal buffer 122 in response to the transfer command TC. It is assumed that security processor 225 temporarily stores the second comparison command CC2 generated when input data ID is received through the external interface 126. The security processor 225 may respond to the transfer command TC to generate the second read command R2, which may be different than the first read command R1 illustrated in FIG. 7. The internal buffer 122 may send the input data ID to the internal interface 121 in response to the second read command R2.

The security IC 220 according to at least one example embodiment may be configured to monitor communication data and to generate an interrupt when the communication data is identical to at least one of a plurality of strings stored in a non-volatile memory 123. By generation of the interrupt, a user may sense inflow of a virus or outflow of private information. The communication data may be interrupted selectively by the user.

Figure 10:
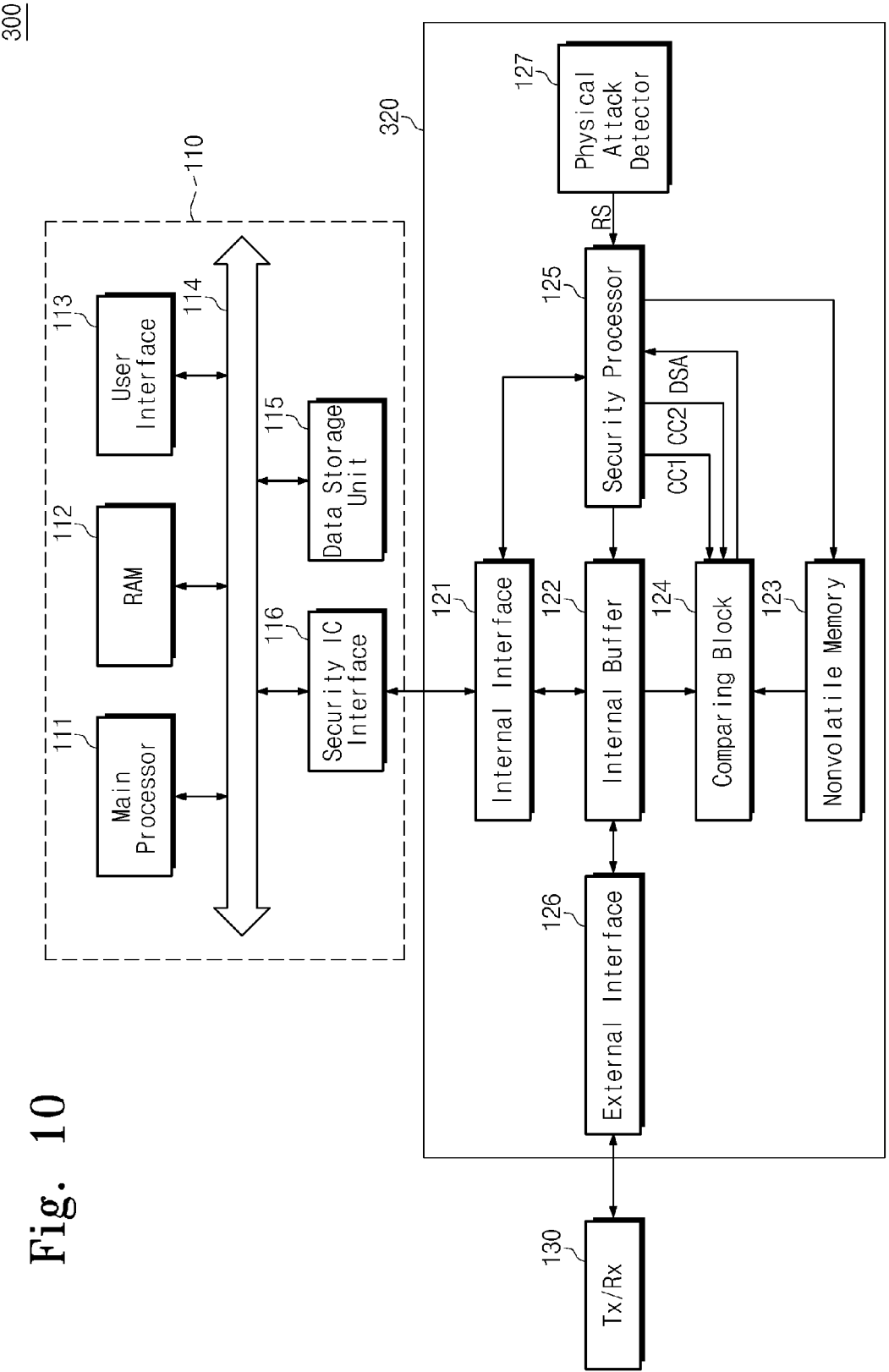
FIG. 10 is a block diagram of a computing system according to at least one example embodiment.

FIG. 10 is a block diagram of a computing system according to at least one example embodiment.

Referring to FIG. 10, a computing system 300 may include a data processing device 110, a security IC 320 and a transceiver 130. The data processing device 110 and the transceiver 130 may be configured in the same manner discussed above with reference to FIG. 1, and description thereof is thus omitted.

The security IC 320 may include an internal interface 121, an internal buffer 122, a non-volatile memory 123, a comparing block 124, a security processor 125, an external interface 126, and a physical attack detector 127. The security IC 320 may be configured to be identical to that in FIG. 1 except for the physical attack detector 127.

The physical attack detector 127 may be configured to detect physical attacks (e.g., a laser, a high voltage, a high frequency, light, etc.) forced from, for example, the outside. For example, in the event that a terminal including the computing system 300 is lost, data stored in the security IC 320 can be leaked by forcing the physical attacks to the security IC 320.

Data transferred within the terminal may be changed by forcing a laser, a high voltage, a high frequency, or light to the computing system within the terminal. Data leakage may be made by monitoring a data variation of the terminal. Critical information stored in the terminal can be leaked through an electrical signal generated whenever the computing system within the terminal operates, for example. The security IC 120 may erase data stored in the non-volatile memory 123 when a physical attack is detected through the physical attack detector 127.

The physical attack detector 127 may send a reset signal RS to the security processor 125 when a physical attack from the outside is detected. The security processor 125 may erase data stored in the non-volatile memory 123 in response to the reset signal RS. That is, when the reset signal RS is generated from the physical attack detector 127, data stored in the non-volatile memory 123 may be erased.

Figure 11:
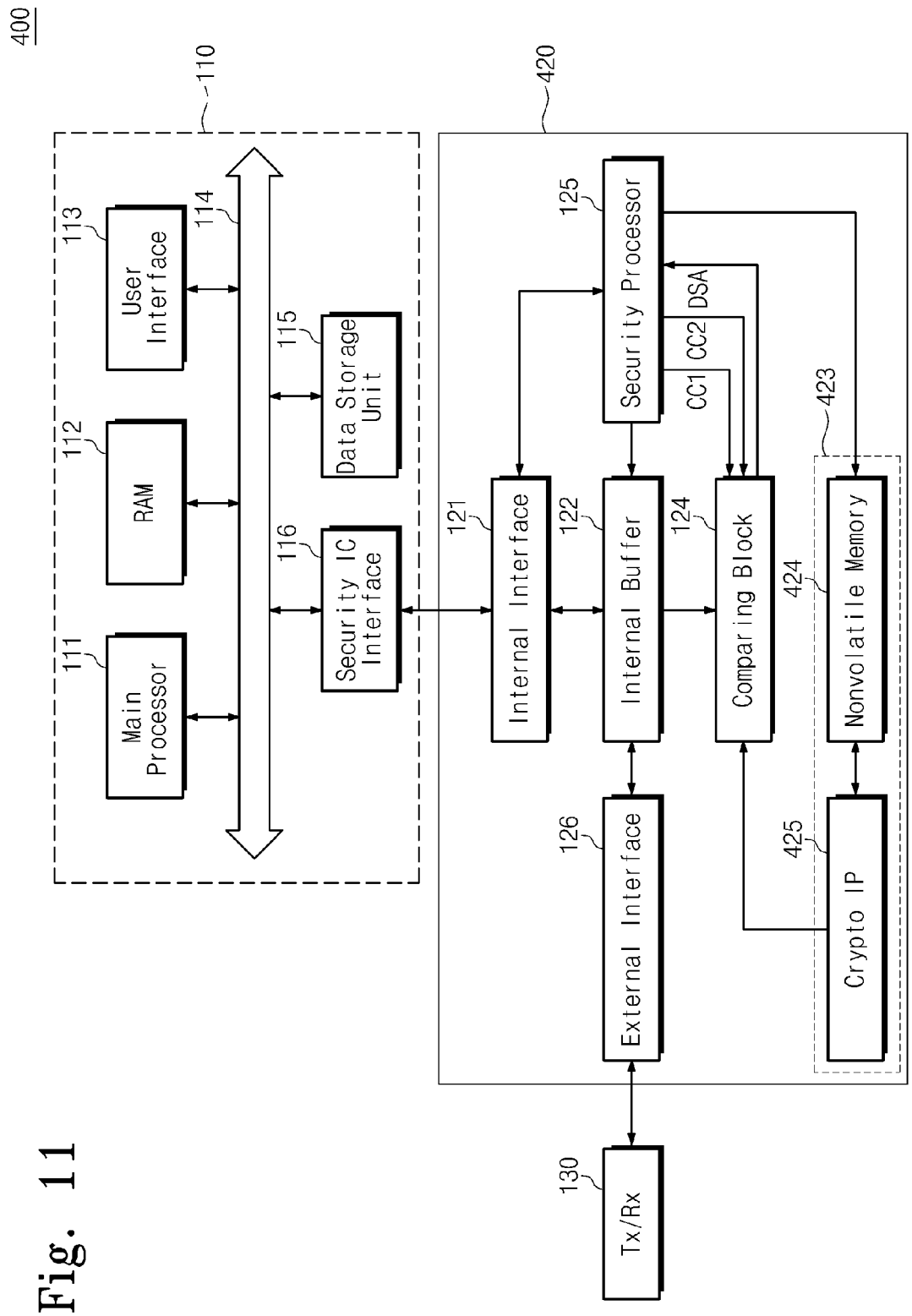
FIG. 11 is a block diagram of a computing system according to at least one example embodiment.

FIG. 11 is a block diagram of a computing system according to at least one example embodiment.

Referring to FIG. 11, a computing system 400 may include a data processing device 110, a security IC 420 and a transceiver 130. The data processing device 110 and the transceiver 130 may be configured the same as those in FIG. 1, and description thereof is thus omitted.

The security IC 420 may be similar to that in FIG. 1 except that a security memory part 423 is used instead of a non-volatile memory 123, and description thereof is thus omitted.

The security memory part 423 may include a non-volatile memory 424 and a crypto/security intellectual property (IP) 425. The security memory part 423 may operate under the control of a security processor 125.

The crypto IP 425 may provide an encoding and decoding function. For example, the crypto IP 425 may store key values for encoding and decoding to perform encoding and decoding operations using the stored key values.

The security memory part 423 may store encoded output-prohibition strings and encoded input-prohibition strings. The crypto IP 425 may be configured to decode the encoded output-prohibition strings and the encoded input-prohibition strings. The decoded output-prohibition and input-prohibition strings may be provided to a comparing block 124.

For example, when data is stored in the non-volatile memory 424, the security memory part 423 may receive data via the crypto IP 425. Output-prohibition strings and input-prohibition strings provided to the crypto IP 425 may be encoded. The encoded output-prohibition and input-prohibition strings may be stored in the non-volatile memory 423. In the event that a user wants to further store output-prohibition strings and input-prohibition strings, encoded output-prohibition and input-prohibition strings may be stored.

Figure 12:
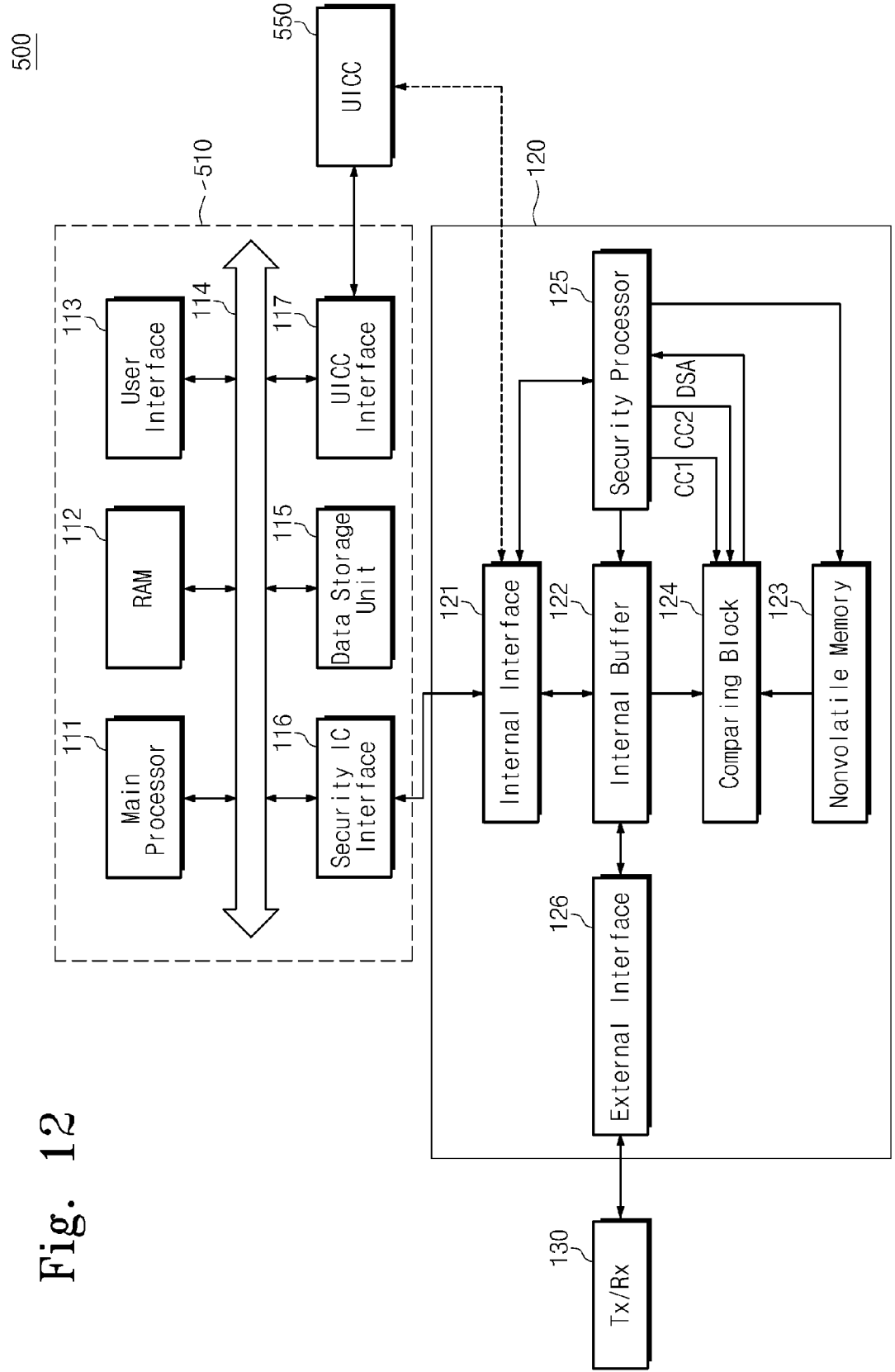
FIG. 12 is a block diagram of a computing system according to at least one example embodiment.

FIG. 12 is a block diagram of a computing system according to at least one example embodiment.

Referring to FIG. 12, a computing system 500 may include a data processing device 510, a security IC 120, a transceiver 130, and a universal integrated circuit card (UICC) 550. The data processing device 510 may be configured in the same manner as that illustrated in FIG. 1 except that an UICC interface 117 is added. The security IC 120 and the transceiver 130 may be configured to be identical to those illustrated in FIG. 1, and description thereof is thus omitted.

The UICC 550 may be connected with the data processing device 510 via the UICC interface 117. The UICC 550 may be used to store critical information such as subscriber information, network information, authentication information, etc. and private information such as a text message, an e-mail, a telephone directory, etc. Further, in a case where the computing system 500 is applied to a terminal, the UICC 550 may store a secret key value for terminal subscriber authentication.

The UICC interface 117 may be connected to a bus 114 and the UICC 550. The data processing device 510 may transfer input data received through the transceiver 130 and the security IC 120 to the UICC 550. The data processing device 510 may send data received from the UICC 550 to the security IC 120.

The security IC 120 may judge whether input data being sent to the UICC 550 coincides with at least one of input-prohibition strings stored in a non-volatile memory 123. The security IC 120 may interrupt the input data according to the judgment. The security IC 120 may judge whether output data received via the data processing device 510 coincides with at least one of output-prohibition strings stored in the non-volatile memory 123. The security IC 120 may interrupt the output data according to the judgment.

As represented by a dotted line, the UICC 550 can be directly connected to an internal interface 121 of the security IC 120. At this time, the security IC 120 may judge whether data (input data) to be sent to the UICC 550 and data (output data) received from the UICC 550 are identical to at least one of strings stored in the non-volatile memory 123. The security IC 120 may filter the input data and the output data according to the judgment.

Figure 13:
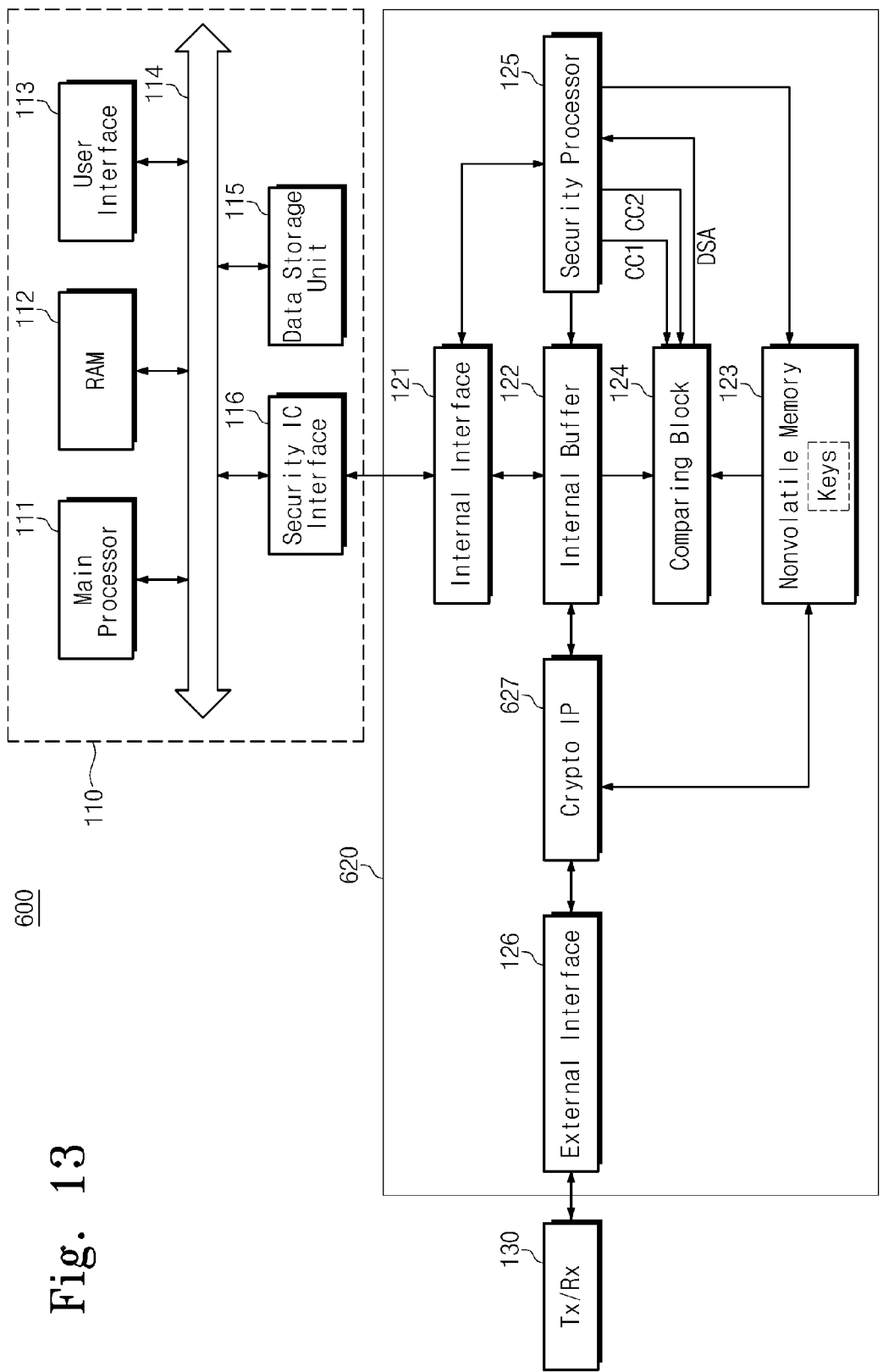
FIG. 13 is a block diagram of a computing system according to at least one example embodiment.

FIG. 13 is a block diagram of a computing system according to at least one example embodiment.

Referring to FIG. 13, a computing system 600 may include a data processing device 110, a security IC 620, and a transceiver 130. The data processing device 110 and the transceiver 130 may be configured to be identical to those in FIG. 1.

The security IC 620 may be configured the same as that described in FIG. 1 except for a crypto intellectual property (IP) 627, and description thereof is thus omitted.

The crypto IP 627 may be configured to encode output data received from an internal buffer 122. The crypto IP 627 may be configured to decode input data received through the transceiver 130 and an external interface 126.

The crypto IP 627 may perform encoding and decoding operations using crypto keys stored in a non-volatile memory 623. For example, the crypto IP 627 may encode output data stored in an internal buffer 122 using encryption keys stored in the non-volatile memory 623. The encoded output data may be sent to the external interface 126. Further, the crypto IP 627 may decode input data received from the external interface 126 using encryption keys stored in the non-volatile memory 623. The decoded input data may be sent to the internal buffer 122.

That is, the security IC 620 may be configured to encode and decode communication data transferred between the data processing device 110 and the transceiver 130. That is, the security IC 620 may provide a security function to the computing system 600. The reliability of the computing system 600 may be improved by providing a security function to the security IC 120 having a high security level (e.g., including an active shield layer) like an integrated circuit card. Further, since encryption keys are stored in the security IC 120, the security level on the encryption keys may be improved although a terminal including the computing system 600 is lost.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A computing system comprising:
 a data processing device configured to exchange communication data with entities outside the computing system and configured to process the communication data; and
 a security integrated circuit (IC) configured to monitor the communication data,
 wherein the security IC includes
 a non-volatile memory configured to store a plurality of strings, and
 a comparing block configured to judge whether the communication data coincides with at least one of the plurality of strings;
 wherein the comparing block is configured to generate a disable signal according to whether the communication data is identical to at least one of the plurality of strings,
 wherein the security IC is configured to send an interrupt signal to the data processing device according to the disable signal,
 wherein the data processing device is configured to provide the security IC with a control signal in response to the interrupt signal so that the security IC filters the communication data, and make inquiries about an interruption of the communication data to a user in response to the interrupt signal, and configured to send the control signal according to an input of the user.

2. The computing system of claim 1, wherein the security IC further comprises:
 a physical attack detector configured to detect a physical attack from outside the computing device and to generate a reset signal based on the detection,
 wherein the security IC is further configured to delete the plurality of strings stored in the non-volatile memory in response to the reset signal.

3. The computing system of claim 1, wherein the security IC is configured to control filtering of the communication data according to the disable signal.

4. The computing system of claim 1, wherein each of the plurality of strings is encoded, the encoded strings being stored in the non-volatile memory, and
 wherein the security IC further includes a security intellectual property unit configured to decode the encoded strings.

5. The computing system of claim 1, wherein the communication data includes input data received from outside the computing system and output data generated by the data processing device, and
 wherein the security IC further comprises a crypto intellectual property unit configured to decode data received from outside the computing system to provide the decoded data as the input data and encoding the output data for transferring the encoded output data outside the computing system.

6. The computing system of claim 1, further comprising:
 a universal integrated circuit card configured to exchange the communication data with the data processing device.

7. The computing system of claim 1, wherein the security IC further comprises:
 an active shield layer formed of a plurality of conductive lines; and
 a detector configured to generate a reset signal when at least one of the plurality of conductive lines is cut,
 wherein the security IC is further configured to erase the plurality of strings stored in the non-volatile memory in response to the reset signal.

8. A computing system comprising:
 a data processing device including a main processor, the data processing device being configured to generate output data according to a control of the main processor;
 a security integrated circuit (IC) including a non-volatile memory storing output prohibition strings, the security IC being configured to filter the output data by judging whether the output data coincides with at least one of the output prohibition strings; and
 a transceiver configured to output the filtered output data outside the computing system,
 wherein the security IC is including an internal buffer, a comparing block and a security processor,
 wherein the internal buffer is configured to temporarily store the output data,
 wherein the comparing block is configured to generate a disable signal by judging whether the output data stored in the internal buffer coincides with at least one of the output prohibition strings,
 wherein the security processor is configured to generate an interrupt signal according to the disable signal, and configured to control the internal buffer so as to perform one of erasing the output data and sending the output data to the transceiver, based on a control signal, wherein the data processing device is configured to transfer the control signal to the security IC in response to the interrupt signal.

9. The computing system of claim 8, wherein the security IC further comprises:

a security processor configured to control the internal buffer and the comparing block, wherein the security processor is further configured to control the internal buffer so as to perform one of erasing the output data and sending the output data to the transceiver, based on the disable signal.

10. The computing system of claim 8, further comprising:

a receiving device configured to receive input data from outside the computing system, wherein the non-volatile memory is further configured to store input prohibition strings, and the security IC further comprises:

an internal buffer configured to temporarily store the input data transferred from the receiving device; and a comparing block configured to generate a disable signal by judging whether the input data stored in the internal buffer is identical to at least one of the input prohibition strings.

11. The computing system of claim 10, wherein the security IC is configured to filter the input data according to the disable signal and, and configured to send the filtered input data to the data processing device.

12. A computing system comprising:

a security unit configured to receive input data received by the computing system, determine whether or not to allow further processing of the input data based on an analysis of the input data and a plurality of strings stored in the security unit; and a data processing device configured to receive allowed input data from the security unit, and configured to process the allowed data, wherein the security unit is configured to send an interrupt signal to the data processing device according to a disable signal based on the analysis of the input data, wherein the data processing device is configured to provide the security unit with a control signal in response to the interrupt signal so that the security unit filters the input data, and make inquiries about an interruption of the input data to a user in response to the interrupt signal, and configured to send the control signal according to an input signal of the user.

13. The system of claim 12 wherein the security unit is a security integrated circuit (IC) including a non-volatile memory configured to store the plurality of strings, and a comparing block configured to determine whether or not to allow further processing of the input data based on the input data and at least one of the plurality of strings.

14. The system of claim 12 wherein the data processing device is configured to generate output data, and the security unit is configured to receive the output data, and configured to determine whether or not to allow the output data to be output from the computing system based on an analysis of the output data.

15. The system of claim 14 wherein the security unit is a security integrated circuit (IC) including a non-volatile memory configured to store a plurality of strings, and a comparing block configured to determine whether or not to allow the output data to be output from the computing system based on the output data and at least one of the plurality of strings.

\* \* \* \* \*